US012701406B2

(12) United States Patent (10) Patent No.: US 12,701,406 B2

Gundavelli et al. (45) Date of Patent: Aug. 4, 2026

(54) DELIVERING IDENTITY PROVIDER SPECIFIC CONFIGURATIONS AND POLICIES

(71) Applicant: Cisco Technology, Inc., San Jose, CA (US)

(72) Inventors: Srinath Gundavelli, San Jose, CA (US); Mark Grayson, Maidenhead (GB); Eric Vyncke, Alleur (BE)

(73) Assignee: Cisco Technology, Inc., San Jose, CA (US)

( * ) Notice: Subject to any disclaimer, the term of this patent is extended or adjusted under 35 U.S.C. 154(b) by 391 days.

(21) Appl. No.: 18/361,525

(22) Filed: Jul. 28, 2023

(65) Prior Publication Data

US 2025/0039662 A1    Jan. 30, 2025

(51) Int. Cl.
  *H04W 8/26*    (2009.01)
  *H04W 76/11*    (2018.01)
  *H04W 84/12*    (2009.01)
(52) U.S. Cl.
  CPC ............ *H04W 8/265* (2013.01); *H04W 76/11* (2018.02); *H04W 84/12* (2013.01)
(58) Field of Classification Search
  CPC ..... H04W 84/12; H04W 8/265; H04W 76/11; H04L 61/4511; H04L 2101/38; H04L 41/0894
  See application file for complete search history.

(56) References Cited

U.S. PATENT DOCUMENTS

| | | | |
|---|---|---|---|
| 9,300,581 B1 * | 3/2016 | Hui ........................ | H04W 72/56 |
| 2016/0028607 A1 | 1/2016 | Weill et al. | |
| 2019/0028431 A1 | 1/2019 | Keller et al. | |
| 2020/0120481 A1 | 4/2020 | Grayson et al. | |
| 2020/0163013 A1 | 5/2020 | Grayson et al. | |
| 2021/0029162 A1 * | 1/2021 | Pan ........................ | G06F 9/453 |
| 2022/0070652 A1 * | 3/2022 | Grayson ............... | H04W 12/06 |
| 2022/0150798 A1 * | 5/2022 | Stammers ............. | H04W 48/18 |
| 2023/0308985 A1 * | 9/2023 | De Foy ................. | H04W 40/24 |

FOREIGN PATENT DOCUMENTS

WO        2022109541 A1    5/2022

* cited by examiner

*Primary Examiner* — Lester G Kincaid

(74) *Attorney, Agent, or Firm* — Patterson + Sheridan, LLP

(57) ABSTRACT

Techniques for wireless communications are disclosed. The techniques include generating a provisioning domain (PVD) identifier by associating a roaming consortium organization identifier (RCOI), relating to an identity federation comprising an identity provider (IDP), with the PVD. The techniques further include providing PVD configuration information from the IDP to a wireless station (STA) associated with the IDP, using the PVD identifier. The techniques further include applying one or more configuration policies at the STA based on the PVD configuration information.

20 Claims, 5 Drawing Sheets

ROUTER SOLICITATION 162

ROUTER ADVERTISEMENT WITH CONFIGURATION OPTIONS 164

160

STA 102

400

START

GENERATE RCOI SPECIFIC PVD ID ⌐402

STA DISCOVERS AND ATTACHES TO
ACCESS NETWORK ⌐404

IDP PROVIDES RCOI PVD INFORMATION
TO ACCESS NETWORK ⌐406

INTERMEDIATE NODE INSERTS RCOI PVD
INFORMATION IN RESPONSE TO STA ⌐408

STA ASSOCIATES PVD
CONFIGURATION WITH RCOI ⌐410

END

DELIVERING IDENTITY PROVIDER SPECIFIC CONFIGURATIONS AND POLICIES

TECHNICAL FIELD

Embodiments presented in this disclosure generally relate to wireless communications. More specifically, embodiments disclosed herein relate to wireless network configurations and policies.

BACKGROUND

OpenRoaming is a federated wireless access service operated under the Wireless Broadband Alliance (WBA) framework. The OpenRoaming architecture can provide seamless onboarding of devices across participating access networks and identity providers (IDPs). The OpenRoaming federation facilitates this interworking by using Roaming Consortium Organization Identifiers (RCOIs) to define some polices that are supported by access network providers (ANPs), as well as policies supported by individual IDPs. But existing solutions do not allow the OR system to influence connecting devices to use more advanced configuration options, including internet protocol (IP) configuration options.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1A:
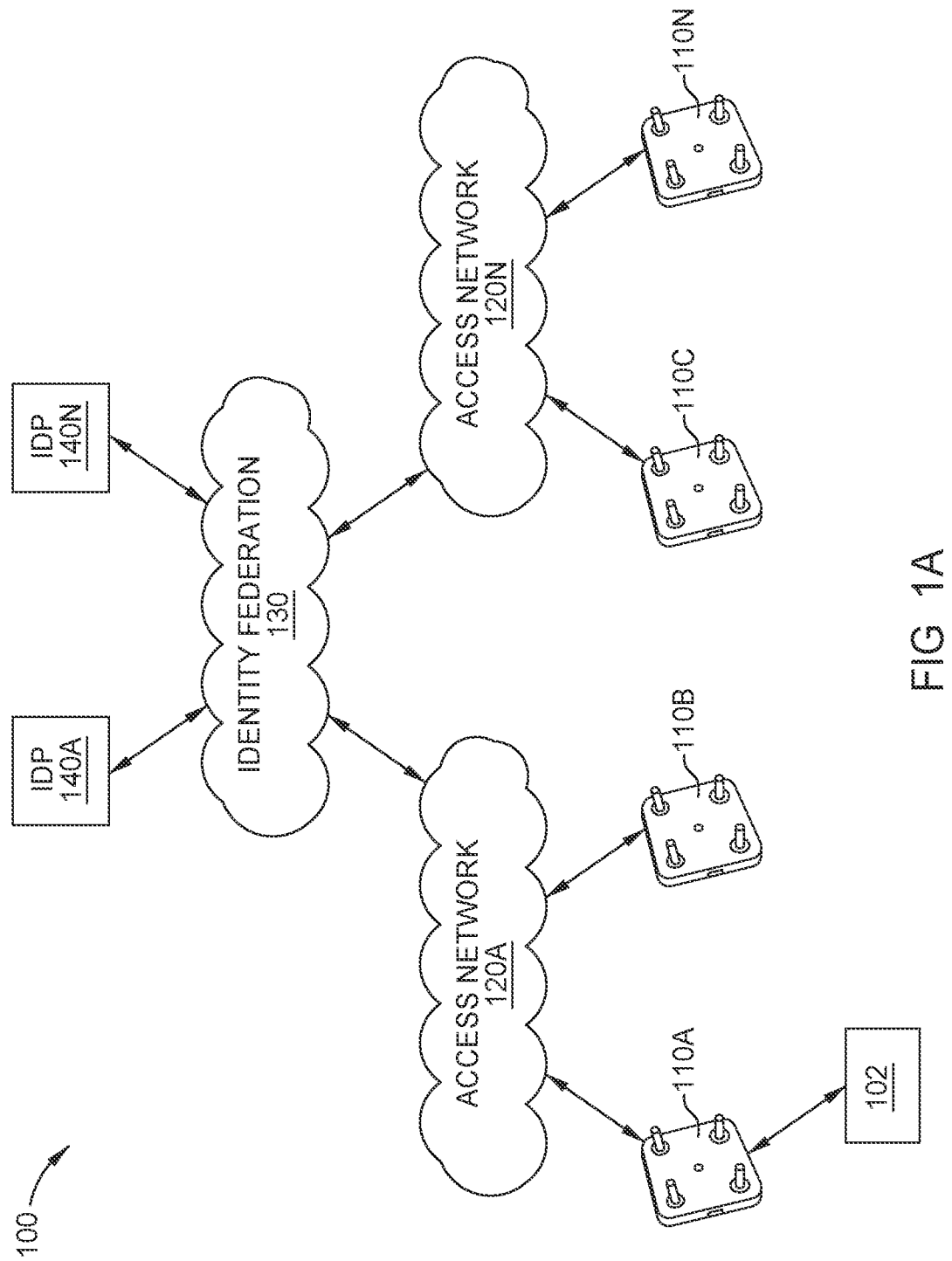
FIG. 1A illustrates a wireless networking environment for delivering identity provider specific configurations and policies using provisioning domains, according to one embodiment.

Embodiments include a method. The method includes generating a provisioning domain (PVD) identifier by associating a roaming consortium organization identifier (RCOI), relating to an identity federation comprising an identity provider (IDP), with the PVD. The method further includes providing PVD configuration information from the IDP to a wireless station (STA) associated with the IDP, using the PVD identifier. The method further includes applying one or more configuration policies at the STA based on the PVD configuration information.

Embodiments further include a system, including a processor and a memory having instructions stored thereon which, when executed on the processor, performs operations. The operations include generating a PVD identifier by associating an RCOI, relating to an identity federation comprising an IDP, with the PVD. The operations further include providing PVD configuration information from the IDP to an STA associated with the IDP, using the PVD identifier. The operations further include applying one or more configuration policies at the STA based on the PVD configuration information.

Embodiments further include a non-transitory computer-readable medium having instructions stored thereon which, when executed by a processor, performs operations. The operations include generating a PVD identifier by associating an RCOI, relating to an identity federation comprising an IDP, with the PVD. The operations further include providing PVD configuration information from the IDP to an STA associated with the IDP, using the PVD identifier. The operations further include applying one or more configuration policies at the STA based on the PVD configuration information.

Example Embodiments

In an embodiment, an RCOI is a 3-octet, or a 5-octet value carried in a beacon information element (IE). Alternatively, or in addition, the RCOI can be sent in access network query protocol (ANQP) messages. An RCOI can identify the groups or identity providers that are supported by the network.

Supported RCOIs are provisioned in wireless local area network (WLAN) elements by access network providers (ANPs) and configured in a suitable profile (e.g., a Passpoint profile) of devices managed by IDPs. When there is a match of RCOIs between WLAN and Passpoint profile, an authentication exchange will be triggered.

Although bits in the RCOI convey some meaning, a wireless station (STA) is not expected to interpret these bits. The STA merely performs a match of RCOIs in its subscription with the indicated RCOIs in the WLAN network. Further, the bits in the RCOI are limited by size on what all it can convey. Basic service indications (e.g., quality of service (QOS) indications, or any other suitable indications) may be formulated from the 12-bits, but delivery of any service configuration, or any extended policy information, is not possible using the limited number of bits from the RCOI.

One or more techniques disclosed herein define RCOI specific provisioning domains (PVDs) which the IDP can maintain and deliver to the WLAN network. PVDs are, for example, consistent sets of network configuration information. This information can include properties that are traditionally associated with a single networking interface, such as source addresses, domain name system (DNS) configuration, and gateway addresses, and any policies such as Application-QoS policies.

Leveraging the PVD framework, and by building a relation between a PVD ID and an RCOI, one or more techniques disclosed herein can deliver configurations and policies maintained for the RCOI at the IDP. For example, the WLAN network can deliver the PVD configuration to the STA (e.g., using IPv6-ND intercept mechanisms). In an embodiment, the configuration information included with the PVD is an IDP managed RCOI-specific uniform resource identifier (URI), facilitating extended-configuration retrieval from the network by the STA.

In an embodiment, building a relation between a PVD ID and an RCOI provides a mechanism where an STA can fetch configuration parameters on an RCOI basis. The mechanics of the delivery can be based on an AP inserting the configuration options it received from the IDP, or allowing the STA to query a URI associated with that PVD. Both techniques allow an STA to obtain configuration options associated with that RCOI or the corresponding PVD ID. In an embodiment, this provides an improved interface where an IDP can deliver configuration information to the STA.

In sum, currently it is not possible in the OpenRoaming system to influence the device to use IDP-provided IP configuration options. In an embodiment, by structuring the RCOI policies under a special PVD, the STA will be aware of the IDP provided options and the access network provided options. For example, the STA can be informed of a home-routed prefix (e.g., a subnet for home-routed traffic) from the IDP, as opposed to an access network provided local-breakout-prefix (e.g., a subnet for local-breakout traffic). Furthermore, in an embodiment, the STA and the IDP will have a direct interface in the form of a URI that the device can query, which can further provide for policy and configuration information.

FIG. 1A illustrates a wireless networking environment 100 for delivering identity provider specific configurations and policies using provisioning domains, according to one embodiment. An identity federation 130 (e.g., an Open-Roaming federation, or any other suitable identity federation) is associated with one or more IDPs 140A-N (e.g., individual IDPs associated with the OpenRoaming federation). The identity federation 130 is further associated with one or more access networks 120A-N. As discussed above, the identity federation 130 can provide seamless onboarding of devices across participating access networks IDPs.

For example, an STA 102 can be associated with an AP 110A, one of a number of APs 110A-N, and other suitable WLAN components (e.g., a WLAN Controller (WLC)), as part of the access network 120A. In an embodiment, the STA can be any suitable client wireless device (e.g., a smart-phone, tablet, laptop or desktop computer, wearable device, Internet of Things (IoT) device, or any other suitable client wireless device). Further, the STA 102 can itself be a WLAN device (e.g., an AP, or any other suitable WLAN device).

In an embodiment, the STA 102 can use the identity federation 130, and one or more of the IDPs 140A-N, for seamless onboarding to the access network 120A. For example, the STA 102 can be associated with a suitable identity federation profile (e.g., a Passpoint profile). The profile can identify an RCOI for the STA 102, an identity for the STA 102, and any other suitable information. As discussed further below in relation to FIGS. 3-4, one of the IDPs 140A-N can provide RCOI PVDs (e.g., as part of the STA on-boarding process), which can deliver configurations and policies maintained for the RCOI at the IDP.

Figure 1B:
FIG. 1B illustrates router discovery and configuration for a wireless station (STA), according to one embodiment.

FIG. 1B illustrates router discovery and configuration for an STA, according to one embodiment. In an embodiment an STA 102 a client can discover a router 160 and obtain configuration details from the network. A new extension to this process is where the network delivers configuration options on a PVD basis. In an embodiment, PVD brings a structure where configuration options are part of a domain. For example, there can be configuration options specific to an enterprise and they can be part of the enterprise PVD.

As one example, FIG. 1B can illustrate IPv6 stateless address auto-configuration (SLAAC) for the STA 102. This is merely an example. In an embodiment, the STA 102 transmits a router solicitation 162 to the router 160. The router 160 responds with a router advertisement (RA) that includes configuration options. For example, the RA can be associated with a PVD, and the PVD can be used to deliver configurations and policies to the STA 102. As discussed further below in relation to FIG. 3, in an embodiment these techniques can be extended to provide RCOI PVDs, which can deliver PVD policy and configuration information for an identity federation architecture.

Figure 2:
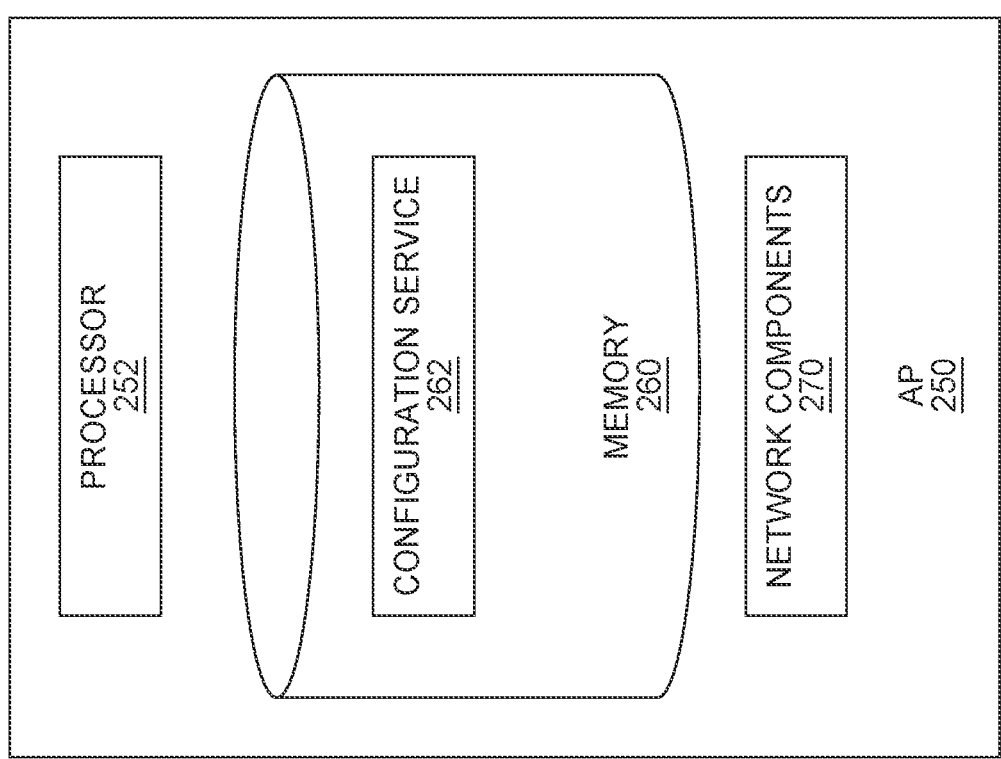
FIG. 2 is a block diagram illustrating an STA and a wireless access point (AP) for delivering identity provider specific configurations and policies using provisioning domains (PVDs), according to one embodiment.
Figure 2:
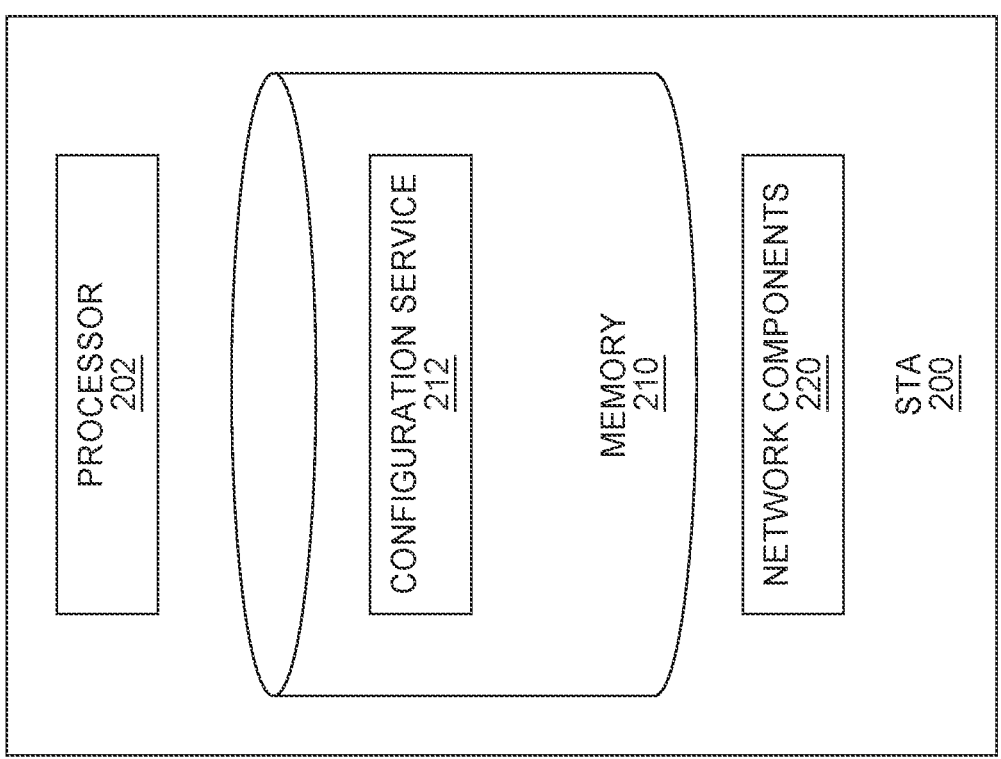

FIG. 2 is a block diagram illustrating an STA 200 and an AP 250 for delivering identity provider specific configurations and policies using PVDs, according to one embodiment. The STA 200 (e.g., the STA 102 illustrated in FIGS. 1A-B, or any other suitable STA) includes a processor 202, a memory 210, and network components 220. The processor 202 generally retrieves and executes programming instructions stored in the memory 210. The processor 202 is included to be representative of a single central processing unit (CPU), multiple CPUs, a single CPU having multiple processing cores, graphics processing units (GPUs) having multiple execution paths, and the like.

The network components 220 include the components necessary for the STA 200 to interface with a wireless communication network, as discussed above in relation to FIGS. 1A-B. For example, the network components 220 can include WiFi or cellular network interface components and associated software.

Although the memory 210 is shown as a single entity, the memory 210 may include one or more memory devices having blocks of memory associated with physical addresses, such as random access memory (RAM), read only memory (ROM), flash memory, or other types of volatile and/or non-volatile memory. The memory 210 generally includes program code for performing various functions related to use of the STA 200. The program code is generally described as various functional "applications" or "modules" within the memory 210, although alternate implementations may have different functions and/or combinations of functions.

Within the memory 210, a configuration service 212 facilitates delivering identity provider specific configurations and policies using PVDs. This is discussed further below with regard to FIGS. 3-4.

The AP 250 includes a processor 252, a memory 260, and network components 270. The processor 252 generally retrieves and executes programming instructions stored in the memory 260. The processor 252 is included to be representative of a single central processing unit (CPU), multiple CPUs, a single CPU having multiple processing cores, graphics processing units (GPUs) having multiple execution paths, and the like.

The network components 270 include the components necessary for the AP 250 to interface with a wireless communication network, as discussed above in relation to FIGS. 1A-B. For example, the network components 270 can include WiFi or cellular network interface components and associated software.

Although the memory 260 is shown as a single entity, the memory 260 may include one or more memory devices having blocks of memory associated with physical addresses, such as random access memory (RAM), read only memory (ROM), flash memory, or other types of volatile and/or non-volatile memory. The memory 260 generally includes program code for performing various functions related to use of the AP 250. The program code is generally described as various functional "applications" or "modules" within the memory 260, although alternate implementations may have different functions and/or combinations of functions.

Within the memory 260, a configuration service 262 facilitates delivering identity provider specific configurations and policies using PVDs. This is discussed further below with regard to FIGS. 3-4. Further, while FIG. 2 illustrates an AP with a configuration service 262, in an embodiment a WLC or any other suitable WLAN component can facilitate delivering identity provider specific configurations and policies using PVDs.

Figure 3:
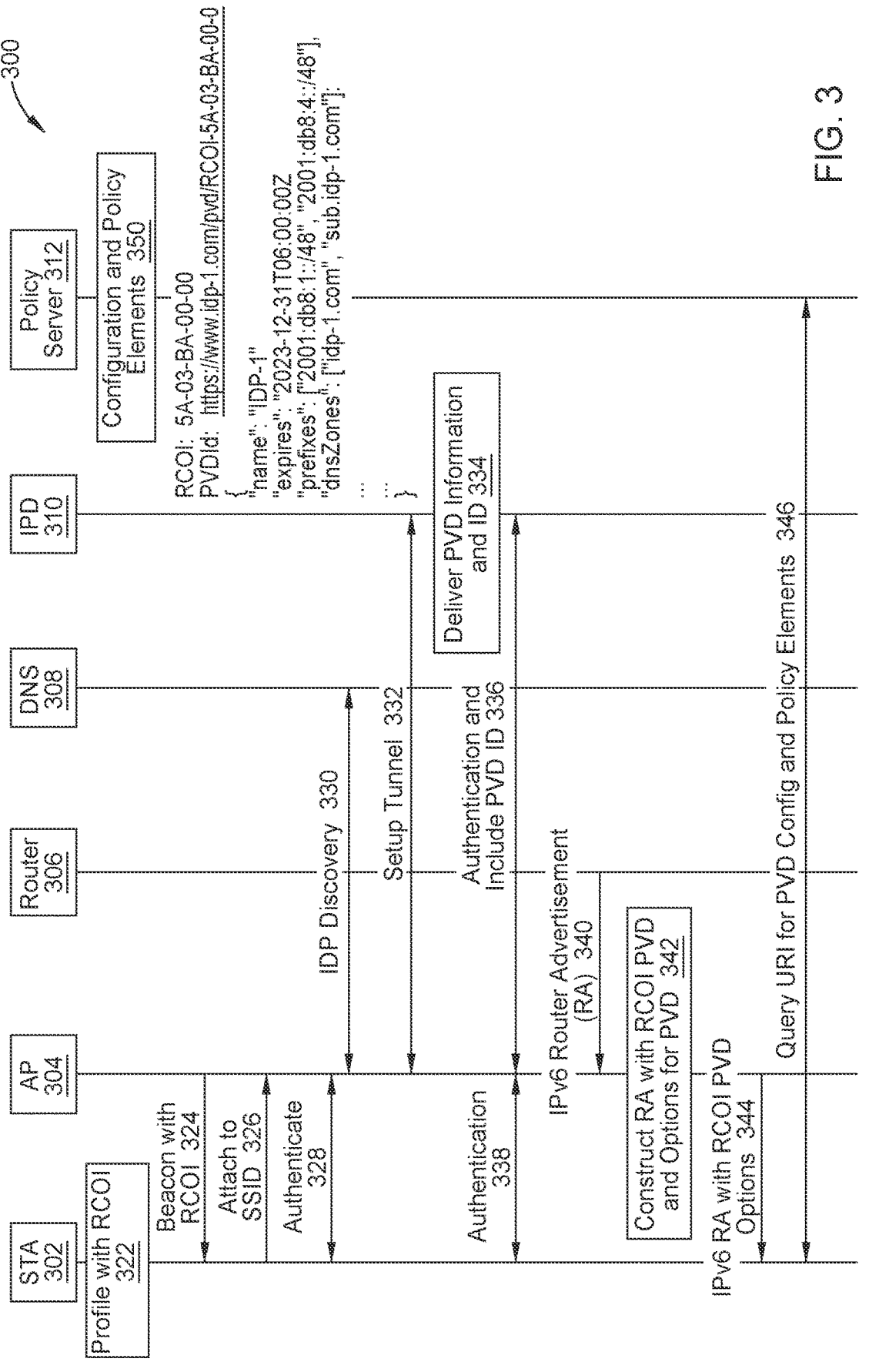
FIG. 3 is a message diagram illustrating delivering identity provider specific configurations and policies using provisioning domains, according to one embodiment.

FIG. 3 is a message diagram 300 illustrating delivering identity provider specific configurations and policies using provisioning domains, according to one embodiment. In an embodiment, an STA 302 (e.g., the STA 200 illustrated in FIG. 2) maintains a profile 322 with an RCOI. For example, the STA 302 can maintain a Passpoint profile with an associated RCOI.

In an embodiment, at 324 an AP 304 (e.g., the AP 250 illustrated in FIG. 2) transmits a beacon including the RCOI. For example, the AP 304 can transmit an 802.11u beacon with the RCOI in an information element (IE). This is merely an example, and the AP 304 can transmit any suitable message including the RCOI in any suitable fashion. Further, the AP 304 is merely an example. A controller (e.g., a WLC), or any other suitable network device, can transmit the RCOI to the STA 302.

At 326, the STA 302 attaches to a service set identifier (SSID) associated with the AP 304. For example, the STA 302 can identify the RCOI received at 324 as matching the RCOI in the profile 322, and can attach to the SSID associated with the AP 304 and matching the RCOI.

At 328, the STA 302 authenticates with the AP 304. For example, the STA 302 and AP 304 can exchange authentication information. In an embodiment, the authentication at 328 does not include credential validation.

At 330, the AP 304 engages in IDP discovery with a DNS 308 (e.g., realm lookup and IDP discovery). For example, the AP 304 can discover an IDP 310.

At 332, the AP 304 and IDP 310 setup a tunnel for transmission. For example, the AP 304 and IDP 310 can setup a transport layer security (TLS) tunnel for communication between the AP 304 and the IDP 310. In an embodiment, the AP 304 and IDP 310 use identity federation issued certificates for authentication.

At 334, the IDP 310 delivers PVD information and ID. In an embodiment, a policy server 312 maintains configuration and policy elements 350. For example, the policy server 312 can maintain configuration and policy elements for each RCOI. FIG. 3 illustrates an example, in which an RCOI 5A-03-BA-00-00 is associated with a PVD ID https://www.idp-1.com/pvd/RCOI-5A-03-BA-00-00 and with numerous configuration and policy elements for the PVD (e.g., a name, expiration, prefixes, DNSzones, and any other suitable policy and configuration information).

At 336 the AP 304 authenticates with the IDP 310. For example, the AP 304 can use extensible authentication protocol (EAP) authentication using a remote authentication dial-in user service (RADIUS) protocol (e.g., using TLS). This authentication can include the PVD ID, along with other PVD options (e.g., a home-routed-prefix, a DNS server, or any other suitable options). At 338, the STA 302 authenticates with the AP 304 (e.g., using EAP messages).

At 340, a router 306 (e.g., a first hop router) transmits an IPv6 RA to the AP 304. At 342, the AP 304 constructs an RA with RCOI PVD options. In an embodiment, the AP 304 constructs an RA with the RCOI PVD ID, and the IDP provided options associated with that PVD. Further, the RA can include any other suitable options (e.g., additional options provided by the router 306 in the RA at 340). In one embodiment, the RA includes the RCOI PVD ID along with any suitable options (e.g., DNS server address), and the receiving STA uses the RCOI PVD ID and any included options for configuration. Alternatively, or in addition, the RA also includes a URI that the STA can use to fetch configuration options. This is discussed further, below, with regard to block 346.

At 344, the AP 304 transmits an IPv6 RA with the RCOI PVD, and options, to the STA 302. While FIG. 3 illustrates transmitting the RCOI PVD using an RA, this is merely an example. Alternatively, or in addition, the RCOI PVD could be provided as part of identity federation authentication, as part of EAP messaging, or using any other suitable technique (e.g., an association request and response).

At 346, the STA 302 queries a URI (e.g., a URI for the given PVD ID) for PVD configuration and policy elements. For example, as discussed above at 350, a PVD ID can be a URI associated with a given RCOI (e.g., https://www.idp-1.com/pvd/RCOI-5A-03-BA-00-00 for the RCOI 5A-03-BA-00-00). The STA 302 can query this URI to access configuration and policy elements associated with the RCOI. In an embodiment, the configuration and policy elements 350 are maintained at the policy server 312. Further, in an embodiment the STA 302 determines whether to query the URI based on a value received from the IDP (e.g., from the IDP to the STA using an intermediate network device). For example, the STA 302 can use the value to determine whether to parse the contents of a network message (e.g., an RA), query a URI, or both.

Figure 4:
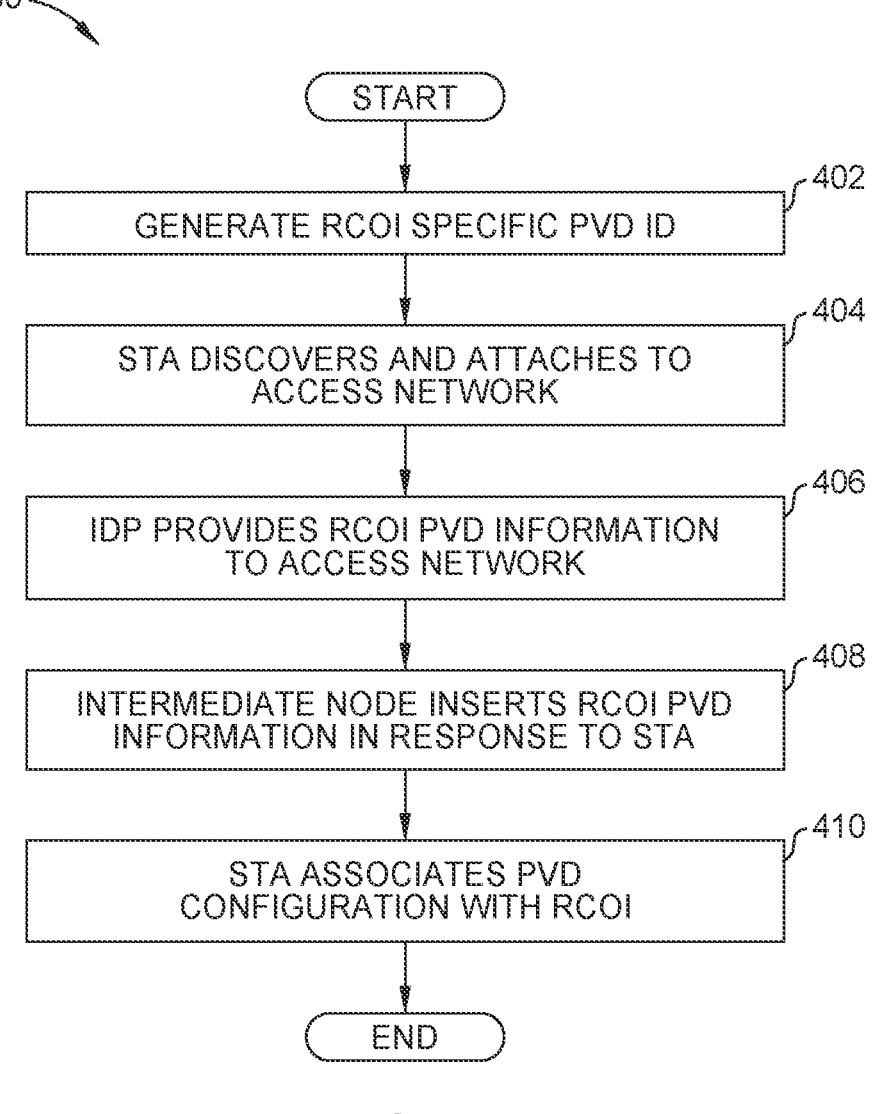
FIG. 4 is a flowchart illustrating delivering identity provider specific configurations and policies using provisioning domains, according to one embodiment.

FIG. 4 is a flowchart 400 illustrating delivering identity provider specific configurations and policies using provisioning domains, according to one embodiment. At block 402, a configuration service (e.g., a configuration service at an IDP, the configuration service 212 or 262 illustrated in FIG. 2, or any other suitable software service) generates an RCOI specific PVD ID. For example, the configuration service associated with an IDP can generate an RCOI specific PVD ID by adding the RCOI suffix to the IDP's fully qualified domain name (FQDN). For example, as discussed above in relation to 350 illustrated in FIG. 3, an RCOI 5A-03-BA-00-00 could be used to generate an RCOI specific PVD ID "https://www.idp-1.com/pvd/RCOI-5A-03-BA-00-00/".

In an embodiment, configurations and policies unique to the RCOI are managed under this PVD. These policies can include any suitable policy, including basic network configuration elements, extended quality of service (QoS) policies, or any other suitable policies. In an embodiment, a new JavaScript object notation (JSON) element is defined for each of the configuration elements.

At block 404, an STA discovers and attaches to an access network. For example, the STA can discover an AP based on a suitable identity federation profile (e.g., a Passpoint profile) and can use an RCOI to match to the access network. In an embodiment, the access network identifies the IDP for STA on-boarding and triggers the authentication process. For example, as illustrated above in FIG. 3 with regard to blocks 324-338, an STA can undertake a series of messages to authenticate an IDP. This is merely an example, and any suitable technique can be used.

At block 406, the IDP provides RCOI PVD information in a response to the access network intermediate node (e.g., an intermediate network device between the IDP and the STA). In an embodiment, the IDP includes the RCOI PVD ID in a RADIUS Access Accept message, along with the configuration elements (e.g., Home-routed prefix, DNS Server) that are to be carried as part of the PVD ID RA option. Further, the IDP can indicate if additional information is available, that an STA can query using the RCOI specific PVD URI (e.g., discussed above in relation to block 402).

At block 408, the intermediate node inserts RCOI PVD information in a response to the STA. In an embodiment, a WLAN element serving as a layer-2 termination node (e.g., a WLC) can intercept the RA (e.g., for unicast delivery, per RFC-6085). As discussed above in relation to block 342 illustrated in FIG. 3, in one embodiment the WLC can insert the RCOI PVD ID along with any suitable options (e.g., DNS server address), and the receiving can use the RCOI PVD ID and any included options for configuration. The WLC can also include access-network provided options, or any suitable options, as implicit PVD options. In an embodiment, the options included in the RA under RCOI PVD may be signed options from the IDP. Alternatively, or in addition, the WLC also include a URI that the STA can use to fetch configuration options.

In an embodiment, in environments where the WLAN network element serves as a first-hop router, with collocated layer-3 functionality, the constructed RA can include the RCOI specific configuration options, as well the access network provided options under different PVDs. Further, if there is indication of the availability of additional options from the IDP (e.g., for retrieval using a URI), a PVD option flag (e.g., the "H" flag) can be toggled (e.g., set to a value of 1).

At block 410, the STA associates PVD configuration and policy options with the RCOI. For example, upon receiving the RA with the PVD option, the STA can associate the configuration options under the RCOI specific PVD with that RCOI. In an embodiment, the STA enforces one or more configuration policies, based on the PVD configuration and policy options. As discussed above, in one embodiment the STA uses provided PVD configuration and policy options. Alternatively, or in addition, the STA accesses a URI to fetch configuration and policy options, and applies those options.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," or "at least one of A or B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method, comprising:
   generating a provisioning domain (PVD) identifier by adding a roaming consortium organization identifier (RCOI), relating to an identity federation comprising an identity provider (IDP), to a domain name of the IDP;
   providing PVD configuration information from the IDP to a wireless station (STA) associated with the IDP, using the PVD identifier; and
   applying one or more configuration policies at the STA based on the PVD configuration information.

2. The method of claim 1, wherein the identity federation comprises an OpenRoaming federation.

3. The method of claim 1, wherein the PVD identifier comprises a uniform resource identifier (URI) comprising at least a portion of the RCOI.

4. The method of claim 3, wherein providing the PVD configuration information from the IDP to the STA associated with the IDP, using the PVD identifier comprises:
   retrieving the one or more configuration policies at the STA by transmitting a query to the URI.

5. The method of claim 4, further comprising:
   determining, based on a value provided by the IDP to the STA, to transmit the query to the URI.

6. The method of claim 1, wherein providing PVD configuration information from the IDP to the STA associated with the IDP, using the PVD identifier, comprises:
   transmitting a network message comprising the PVD identifier from the IDP to an intermediate network device between the IDP and STA.

7. The method of claim 6, wherein the network message comprises a remote authentication dial-in user service (RADIUS) access accept message.

8. The method of claim 6, wherein the intermediate network device inserts the PVD identifier into a second network message and transmits the second network message to the STA.

9. The method of claim 8, wherein the second network message comprises a router advertisement (RA).

10. The method of claim 6, wherein the intermediate network device comprises at least one of: (i) a wireless local area network (WLAN) controller (WLC) or (ii) a wireless access point (AP).

11. A system, comprising:
    a processor; and
    a memory having instructions stored thereon which, when executed on the processor, performs operations comprising:
       generating a provisioning domain (PVD) identifier by adding a roaming consortium organization identifier (RCOI), relating to an identity federation comprising an identity provider (IDP), to a domain name of the IDP;
       providing PVD configuration information from the IDP to a wireless station (STA) associated with the IDP, using the PVD identifier; and
       applying one or more configuration policies at the STA based on the PVD configuration information.

12. The system of claim 11, wherein the PVD identifier comprises a uniform resource identifier (URI) comprising at least a portion of the RCOI.

13. The system of claim 12, wherein providing the PVD configuration information from the IDP to the STA associated with the IDP, using the PVD identifier comprises:
    retrieving the one or more configuration policies at the STA by transmitting a query to the URI.

14. The system of claim 11, wherein providing PVD configuration information from the IDP to the STA associated with the IDP, using the PVD identifier, comprises:
    transmitting a network message comprising the PVD identifier from the IDP to an intermediate network device between the IDP and STA.

15. The system of claim 14, wherein the intermediate network device inserts the PVD identifier into a second network message and transmits the second network message to the STA.

16. A non-transitory computer-readable medium having instructions stored thereon which, when executed by a processor, performs operations comprising:
    generating a provisioning domain (PVD) identifier by adding a roaming consortium organization identifier (RCOI), relating to an identity federation comprising an identity provider (IDP), to a domain name of the IDP;
    providing PVD configuration information from the IDP to a wireless station (STA) associated with the IDP, using the PVD identifier; and
    applying one or more configuration policies at the STA based on the PVD configuration information.

17. The non-transitory computer-readable medium of claim 16, wherein the PVD identifier comprises a uniform resource identifier (URI) comprising at least a portion of the RCOI.

18. The non-transitory computer-readable medium of claim 17, wherein providing the PVD configuration information from the IDP to the STA associated with the IDP, using the PVD identifier comprises:
    retrieving the one or more configuration policies at the STA by transmitting a query to the URI.

19. The non-transitory computer-readable medium of claim 16, wherein providing PVD configuration information from the IDP to the STA associated with the IDP using the PVD identifier, comprises:
    transmitting a network message comprising the PVD identifier from the IDP to an intermediate network device between the IDP and STA.

20. The non-transitory computer-readable medium of claim 19, wherein the intermediate network device inserts the PVD identifier into a second network message and transmits the second network message to the STA.

\* \* \* \* \*